United States Patent
Rahbari Asr et al.

(10) Patent No.: US 10,994,617 B2
(45) Date of Patent: May 4, 2021

(54) DISTRIBUTED BATTERY THERMAL RUNAWAY DETECTION

(71) Applicant: Ford Global Technologies, LLC, Dearborn, MI (US)

(72) Inventors: Navid Rahbari Asr, Inkster, MI (US); Jeffery R. Grimes, Canton, MI (US); Wai Hwa Fong, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 18 days.

(21) Appl. No.: 16/194,680

(22) Filed: Nov. 19, 2018

(65) Prior Publication Data

US 2020/0156475 A1    May 21, 2020

(51) Int. Cl.
| | |
|---|---|
| *B60L 3/00* | (2019.01) |
| *G08B 29/06* | (2006.01) |
| *B60L 58/10* | (2019.01) |
| *B60K 6/28* | (2007.10) |

(52) U.S. Cl.
CPC ............ *B60L 3/0046* (2013.01); *B60L 58/10* (2019.02); *G08B 29/06* (2013.01); *B60K 6/28* (2013.01); *B60Y 2200/91* (2013.01); *B60Y 2200/92* (2013.01)

(58) Field of Classification Search
CPC ....... B60L 3/0046; B60L 58/10; G08B 29/06; B60K 6/28; B60Y 2200/91; B60Y 2200/92
USPC ........... 340/425.5, 426.1, 438, 539.1, 539.11
See application file for complete search history.

(56) References Cited

U.S. PATENT DOCUMENTS

| | | | |
|---|---|---|---|
| 5,563,496 | A | 10/1996 | McClure |
| 5,914,656 | A | 6/1999 | Ojala et al. |
| 5,965,997 | A | 10/1999 | Alwardi et al. |
| 6,456,948 | B1 | 9/2002 | Lim |
| 6,697,897 | B1 | 2/2004 | Friel et al. |
| 7,041,400 | B2 | 5/2006 | Kim et al. |
| 7,433,794 | B1 | 10/2008 | Berdichevsky et al. |
| 7,638,979 | B2 | 12/2009 | Vandensande |
| 7,723,955 | B2 | 5/2010 | Zaag et al. |
| 8,168,315 | B1 | 5/2012 | Hermann |

(Continued)

FOREIGN PATENT DOCUMENTS

| | | |
|---|---|---|
| CN | 108051750 A | 5/2018 |
| CN | 108177525 A | 6/2018 |

(Continued)

OTHER PUBLICATIONS

Koch et al. (2018). Fast Thermal Runaway Detection for Lithium-Ion Cells in Large Scale Traction Batteries. Batteries 2018. Retrieved from: http://www.mdpi.com/journal/batteries.

(Continued)

*Primary Examiner* — Daryl C Pope
(74) *Attorney, Agent, or Firm* — David B. Kelley; Carlson, Gaskey & Olds, P.C.

(57) ABSTRACT

A system includes a primary monitoring system to determine a battery status of a battery pack and a secondary monitoring system configured to monitor the battery status as communicated by the primary monitoring system over a network. At least one of the primary and secondary monitoring systems generates a warning signal when the battery status comprises a thermal event that reaches a predetermined level.

13 Claims, 2 Drawing Sheets

(56) References Cited

U.S. PATENT DOCUMENTS

| | | | |
|---|---|---|---|
| 8,237,405 B2 | 8/2012 | Li | |
| 8,930,800 B2 | 1/2015 | Li et al. | |
| 9,140,759 B2 | 9/2015 | Bolduc | |
| 9,142,994 B2 | 9/2015 | Berkowitz et al. | |
| 9,341,678 B2 | 5/2016 | Kim et al. | |
| 9,428,073 B2 | 8/2016 | Baughman et al. | |
| 9,702,940 B2 | 7/2017 | Maluf et al. | |
| 9,726,554 B1 | 8/2017 | Ghantous et al. | |
| 9,751,427 B2 | 9/2017 | Loftus | |
| 9,766,298 B2 | 9/2017 | Lennevi et al. | |
| 9,787,122 B2 | 10/2017 | Berkowitz et al. | |
| 9,791,513 B2 | 10/2017 | Maluf et al. | |
| 2005/0162129 A1 | 7/2005 | Mutabdzija et al. | |
| 2007/0123304 A1 | 5/2007 | Pattenden et al. | |
| 2008/0180106 A1 | 7/2008 | Gorbold | |
| 2010/0000282 A1 | 1/2010 | Vandine | |
| 2010/0197366 A1 | 8/2010 | Pattenden et al. | |
| 2010/0289521 A1 | 11/2010 | Nakata | |
| 2011/0316548 A1 | 12/2011 | Ghantous et al. | |
| 2012/0009445 A1 | 1/2012 | Li | |
| 2012/0047408 A1 | 2/2012 | Wilborn et al. | |
| 2012/0200266 A1 | 8/2012 | Berkowitz et al. | |
| 2012/0242144 A1* | 9/2012 | Chorian | H01M 2/34 307/9.1 |
| 2012/0322513 A1 | 12/2012 | Pattenden et al. | |
| 2013/0141109 A1 | 6/2013 | Love et al. | |
| 2014/0189376 A1* | 7/2014 | Rotem | G06F 1/206 713/300 |
| 2014/0197682 A1 | 7/2014 | Tabatowski-Bush et al. | |
| 2015/0057728 A1 | 2/2015 | Ayal et al. | |
| 2015/0231985 A1 | 8/2015 | Li | |
| 2015/0377976 A1 | 12/2015 | Maluf et al. | |
| 2016/0020451 A1 | 1/2016 | Lev et al. | |
| 2016/0020496 A1* | 1/2016 | Burrows | B60L 1/02 429/62 |
| 2016/0023566 A1 | 1/2016 | Lee | |
| 2016/0202322 A1 | 7/2016 | Schaedlich et al. | |
| 2016/0223412 A9 | 8/2016 | Patel et al. | |
| 2016/0336627 A1 | 11/2016 | Syed et al. | |
| 2016/0355198 A1* | 12/2016 | Dulmage | B60T 17/228 |
| 2017/0054311 A1* | 2/2017 | Masias | B60L 53/62 |
| 2017/0075345 A1 | 3/2017 | Fisher et al. | |
| 2017/0078455 A1 | 3/2017 | Fisher et al. | |
| 2017/0352925 A1 | 12/2017 | Wand et al. | |

FOREIGN PATENT DOCUMENTS

| | | |
|---|---|---|
| EP | 1806592 A1 | 7/2007 |
| EP | 3085568 A1 | 10/2016 |
| JP | 2012048857 A | 3/2012 |
| KR | 20100012595 A | 2/2010 |
| WO | 9001221 A | 2/1990 |

OTHER PUBLICATIONS

'TPS382x Voltage Monitor With Watchdog Timer' datasheet, Texas Instruments, Apr. 1998—Revised Nov. 2015.

'What dictionary changes force recompiling: Time Stamp and CRC?' by Knowledgebase, Dec. 21, 2015.

'CDC or Delta processing—at the staging database' by Toolbox, Sep. 2009.

'Overview of 1-Wire Technology and Its Use' by Bernhard Linke, Jun. 19, 2008. (Year: 2008).

1-Wire protocol simple and easy by ScienceProg, Feb. 28, 2007. (Year: 2007).

* cited by examiner

DISTRIBUTED BATTERY THERMAL RUNAWAY DETECTION

TECHNICAL FIELD

This disclosure relates to primary and secondary monitoring systems for a battery pack that are in communication with each other to detect a thermal event that exceeds a predetermined level.

BACKGROUND

The desire to reduce automotive fuel consumption and emissions is well documented. Therefore, vehicles are being developed that reduce or completely eliminate reliance on internal combustion engines. Electrified vehicles are one type of vehicle currently being developed for this purpose. In general, electrified vehicles differ from conventional motor vehicles because they are selectively driven by one or more battery powered electric machines. Conventional motor vehicles, by contrast, rely exclusively on the internal combustion engine to drive the vehicle.

A high voltage battery pack typically powers the electric machines and other electrical loads of the electrified vehicle. The battery pack includes a plurality of battery cells arranged in one or more cell stacks or groupings. The battery cells require monitoring to maximize efficiency, maximize performance, and detect potential battery malfunctions. It is important to identify any potential battery malfunctions in an efficient and reliable manner.

SUMMARY

A system according to an exemplary aspect of the present disclosure includes, among other things, a primary monitoring system to determine a battery status of a battery pack and a secondary monitoring system configured to monitor the battery status as communicated by the primary monitoring system over a network. At least one of the primary and secondary monitoring systems generates a warning signal when the battery status comprises a thermal event that reaches a predetermined level.

In a further non-limiting embodiment of the foregoing system, the primary monitoring system monitors at least one battery characteristic and determines the battery status based on the at least one battery characteristic.

In a further non-limiting embodiment of either of the foregoing systems, the at least one battery characteristic comprises at least one of battery temperature, voltage, or current.

In a further non-limiting embodiment of any of the foregoing systems, the primary monitoring system is located within the battery pack.

In a further non-limiting embodiment of any of the foregoing systems, the secondary monitoring system is located externally of the battery pack.

In a further non-limiting embodiment of any of the foregoing systems, the network comprises a CAN.

In a further non-limiting embodiment of any of the foregoing systems, the secondary monitoring system uses external information and the battery status to determine when to generate the warning signal.

In a further non-limiting embodiment of any of the foregoing systems, the external information comprises a loss of communication with the primary monitoring system.

In a further non-limiting embodiment of any of the foregoing systems, the thermal event comprises a thermal runaway event and wherein the predetermined level comprises at least a first level where the battery status is normal and a second level where at least one battery pack malfunction is identified.

In a further non-limiting embodiment of any of the foregoing systems, the warning signal is generated by the primary or secondary monitoring system when the second level is reached.

In a further non-limiting embodiment of any of the foregoing systems, the warning signal is generated by the secondary monitoring system when the primary monitoring system has communicated the battery status is at the second level and there is a subsequent loss of communication with the primary monitoring system once the second level has been identified.

A system according to another exemplary aspect of the present disclosure includes, among other things, a primary monitoring system located in a battery pack to determine a battery status and a secondary monitoring system located externally of the battery pack and configured to monitor the battery status over a CAN. At least one of the primary and secondary monitoring systems generates a warning signal when the battery status indicates a thermal runaway event.

In a further non-limiting embodiment of any of the foregoing systems, the primary monitoring system monitors battery characteristics to determine the battery status, and wherein the primary monitoring system generates a detection signal when at least one battery characteristic exceeds a predetermined level.

In a further non-limiting embodiment of any of the foregoing systems, the battery characteristics comprise at least battery temperature, voltage, and current.

In a further non-limiting embodiment of any of the foregoing systems, the secondary monitoring system is activated in response to receiving a communication of the detection signal.

In a further non-limiting embodiment of any of the foregoing systems, the secondary monitoring system uses external information and the detection signal to determine when to generate the warning signal.

In a further non-limiting embodiment of any of the foregoing systems, the external information comprises a loss of communication with the primary monitoring system, and wherein the secondary monitoring system generates the warning signal if there is a loss of communication with the primary monitoring system after the detection signal has been communicated.

A method according to another exemplary aspect of the present disclosure includes, among other things, providing a primary monitoring system in a battery pack to determine a battery status, locating a secondary monitoring system externally of the battery pack to monitor the battery status over a CAN, and generating a warning signal via at least one of the primary and secondary monitoring systems when the battery status indicates a thermal runaway event.

In a further non-limiting embodiment of the foregoing method, the primary monitoring system monitors battery characteristics to determine the battery status, and the method includes generating a detection signal via the primary monitoring system when at least one battery characteristic exceeds a predetermined level, and activating the secondary monitoring system in response to receiving a communication of the detection signal.

In a further non-limiting embodiment of either of the foregoing methods, the method includes generating the warning signal via the secondary monitoring system if there is a loss of communication with the primary monitoring system after the detection signal has been communicated to the secondary monitoring system.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

Figure 1:
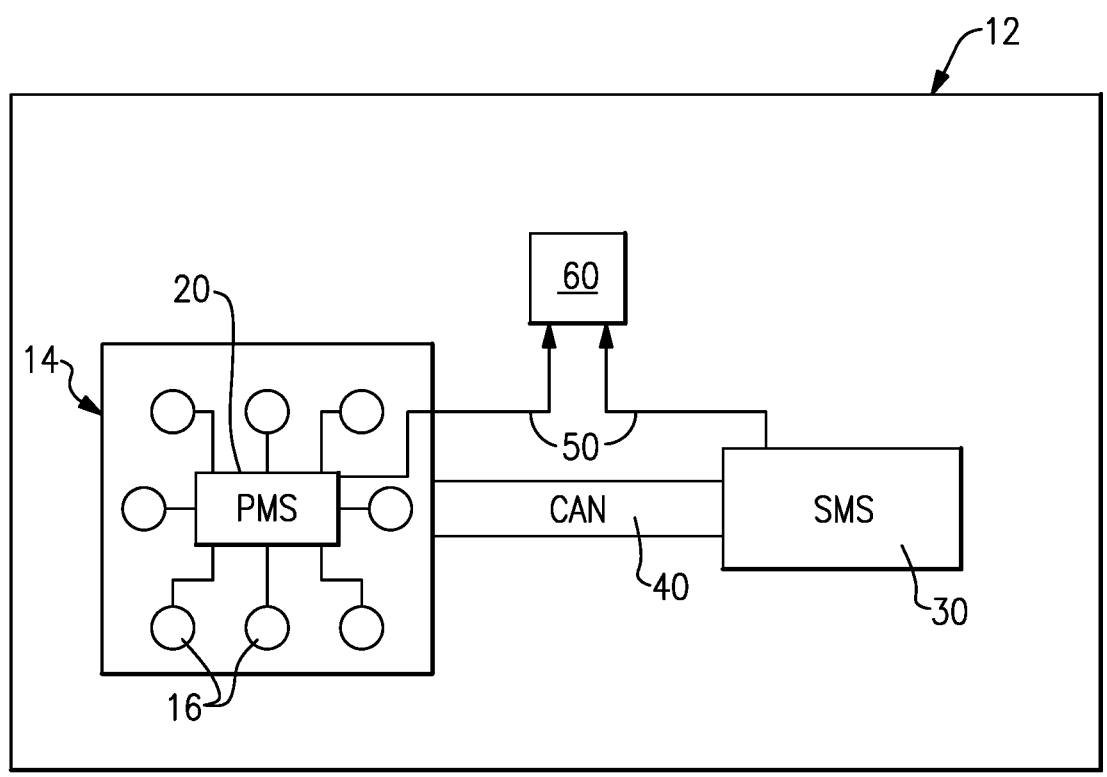
FIG. 1 schematically illustrates a battery pack of an electrified vehicle.

This disclosure details a system and method where primary and secondary monitoring systems for a battery pack are in communication with each other to detect an undesirable thermal event. More particularly, this disclosure details a system and method for generating a warning signal when a battery status of the battery pack indicates a thermal runaway event FIG. 1 schematically illustrates an electrified vehicle 12, which can be a hybrid electric vehicle (HEV) or other electrified vehicle, including, but not limited to, a plug-in hybrid electric vehicle (PHEV), a battery electric vehicle (BEV), a fuel cell vehicle, etc. The vehicle 12 includes a battery pack 14 that is an exemplary electrified vehicle battery. The battery pack 14 may be a high voltage traction battery pack that includes a plurality of battery assemblies 16 (i.e., battery arrays or groupings of battery cells) capable of outputting electrical power and/or other electrical loads of the electrified vehicle 12.

High voltage batteries that are used for vehicle electrification can create undesirable conditions for vehicle occupants if the batteries become thermally unstable. One thermally unstable battery cell can initiate thermal instability in adjacent cells. Multiple-cell thermal events, e.g. thermal propagation, may release enough energy to require a warning signal to be generated such that occupants can exit the vehicle.

The subject invention provides a thermal event detection system that includes, in one exemplary configuration, a primary monitoring system 20 that is located in the battery pack 14 to determine a battery status and a secondary monitoring system 30 that is located externally of the battery pack 14 and is configured to monitor the battery status over a network, such as a Controller Area Network (CAN) 40 or other similar network, for example. At least one of the primary 20 and secondary 30 monitoring systems generates a warning signal 50 when the battery status comprises a thermal event that reaches a predetermined level. An example of one such thermal event is a thermal runaway event where thermal propagation can occur. The warning signal 50 can trigger an alarm 60 that can include visual, tactile, and/or audible component(s).

The primary monitoring system 20 monitors one or more battery characteristics to determine the battery status. In one example, the primary monitoring system 20 generates a detection signal when at least one battery characteristic exceeds a predetermined level. The battery characteristic can comprise one or more of battery temperature, voltage, current, etc. The primary monitoring system 20 communicates the detection signal to the secondary monitoring system 30.

Figure 2:
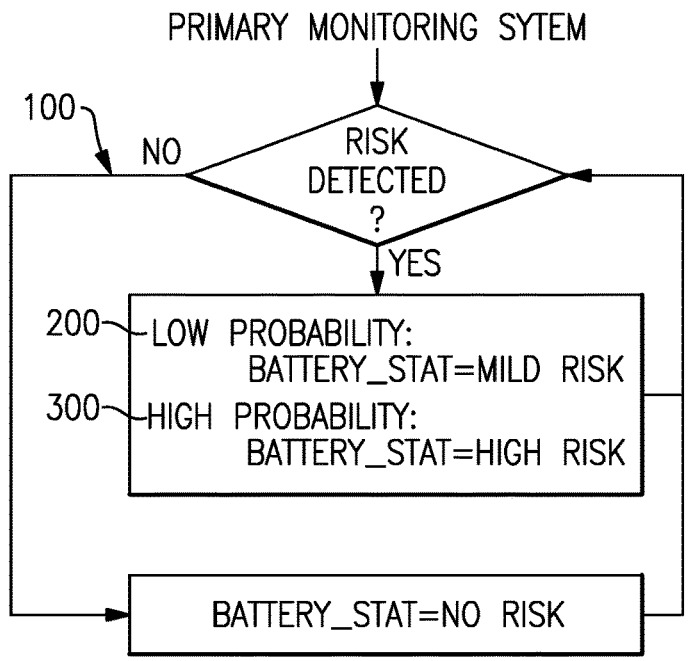
FIG. 2 is a flow chart for a primary monitoring system of the battery pack.

As shown in the example of FIG. 2, the primary monitoring system 20 can characterize the battery status as levels of risk. For example, if none of the battery characteristics exceeds a predetermined level, then there is a level one low risk, e.g. no risk condition. This is shown at loop 100 in FIG. 1. If at least one of the battery characteristics exceeds a predetermined level, then there is a level two or mild risk. This would mean that there would be a low probability for a risk of a thermal runaway event. This is shown at step 200 in FIG. 2. If more than one of the battery characteristics exceeds a predetermined level, then there is a level three high risk. This would mean that there would be a high probability for a risk of a thermal runaway event. This is shown at step 300 in FIG. 2.

Figure 3:
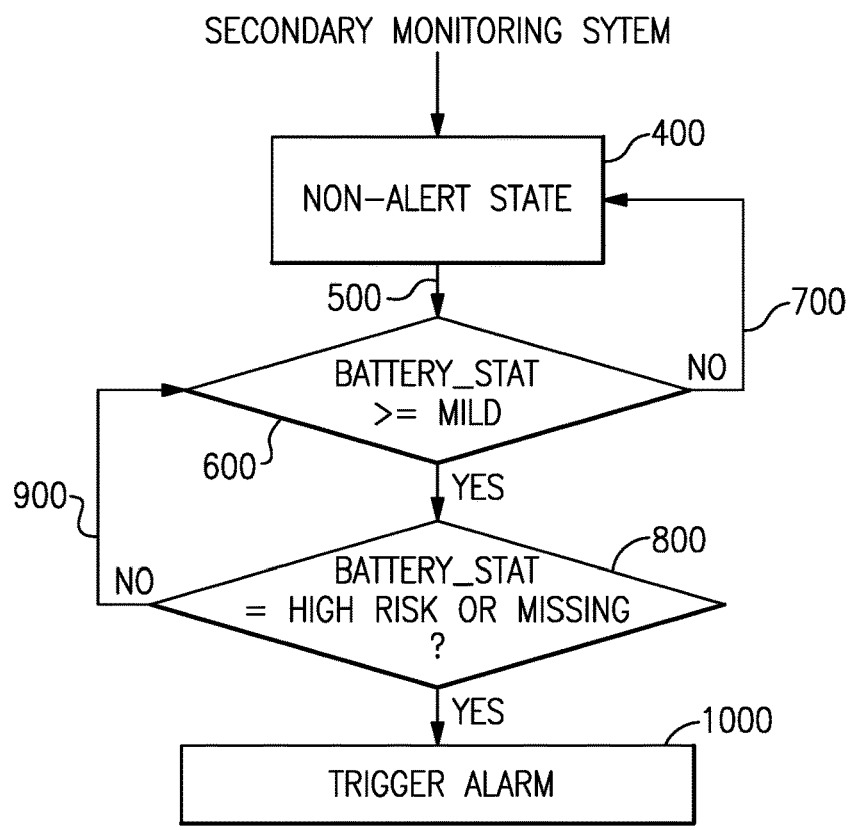
FIG. 3 is a flow chart of a secondary monitoring system that communicates with the primary monitoring system.

The primary monitoring system 20 communicates battery status information to the secondary monitoring system 30 over the CAN 40. As shown in FIG. 3, the secondary monitoring system 30 is in a non-alert state 400 when the primary monitoring system 20 is at a level one state, e.g. no risk condition. When at least one battery characteristic exceeds a predetermined level, there may be a potential risk condition and the detection signal is communicated to the secondary monitoring system 30. This communication activates, awakens, or makes the secondary monitoring system 30 aware that there is a potential for a thermal runaway event (see step 500). The secondary monitoring system 30 then determines if the battery status level is greater than or equal to a level two, e.g. mild risk level, as indicated at step 600. If the secondary monitoring system 30 determines that the battery status is less than a mild level, then the secondary monitoring system returns to the non-alert state 400 as indicated at 700. If the secondary monitoring system 30 determines that the battery status is greater than or equal to a mild risk level, the secondary monitoring system 30 advances to step 800 where the secondary monitoring system 30 determines whether the battery status is equal to a level three, e.g. high risk level. If the secondary monitoring system 30 determines that the battery status is less than a high risk level, then the secondary monitoring system returns to the low risk level 600 as indicated at step 900. If the secondary monitoring system 30 determines that the battery status is greater than or equal to a high risk level, or if the battery status is missing, the secondary monitoring system 30 advances to step 1000 to trigger the alarm 60.

In one example, the secondary monitoring system 30 also uses external information in addition to the battery status to determine when to generate the warning signal 50. In one example, the external information comprises a loss of communication with the primary monitoring system 20. Thus, for example, if the secondary monitoring system 30 has received a detection signal from the primary monitoring system 20 indicating a mild or high risk level, i.e. the secondary monitoring system 30 is in an alert state, the secondary monitoring system 30 will generate the warning signal 50 if there is a subsequent loss of communication with the primary monitoring system 20, e.g. the battery status signal is missing and/or not being communicated.

Thus, the subject invention provides a detection mechanism that is distributed between two different and independent modules. The primary monitoring system 20 uses direct measurements from inside the high voltage battery pack 14 for temperature, voltage, current, etc., for individual cells 16. This primary monitoring system 20 is therefore mounted within the same physical enclosure as the battery cells 16. In one example, a Battery Energy Control Module (BECM) can serve as the primary monitoring system 20. The secondary monitoring system 30 monitors the battery status as transmitted over the CAN 40 by the primary monitoring system 20. As discussed above, the secondary monitoring system 30 may use external information, coupled with battery status information, to increase the statistical confidence of detection of a thermal runaway event. Any control module installed external to the battery system, e.g. battery pack 14, can serve as the secondary monitoring system 30.

The primary monitoring system 20 transmits a progressive risk detection signal indicating increased probability of an undesirable thermal event, e.g. low, mild, and high. The primary 20 and the secondary 30 monitoring systems both have the capability of triggering the alarm 60. The secondary monitoring system 30 can trigger the alarm 60 based on the primary monitoring system's battery status signal directly, or based on the detection signal in combination with an external condition such as loss of communication with the primary monitoring system 20.

This is an improvement over prior configurations where the microcontrollers that were tasked with monitoring battery status were located solely within the battery pack. This location subjects the monitoring system to damage from energy released early in the thermal propagation event. Further, battery monitoring systems include hundreds of sensing circuits, each with an expected probability of failure. To the traditional monitoring system, sensor failures often have an electric signature similar to that measured during a thermal runaway event. This adds an inherent uncertainty to detection methods and increases the risk of false positives.

The subject invention reduces the number of false positives by using two independent monitoring systems. Further, if there is not a thermal runaway event, the primary monitoring system 20 will not inadvertently declare a thermal runaway as the battery status signal will still be available to the secondary monitoring system 30. Further, the distributed detection reduces the chance of missing thermal runaway detection due to losing the primary monitoring system because once this loss is detected by the secondary monitoring system, the alarm will be triggered. An additional benefit of this system is that no additional sensors are needed and the existing system architecture can be used without increasing system cost.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A system, comprising:
    a primary monitoring system to determine a battery status of a battery pack for an electrified vehicle, wherein the primary monitoring system comprises a Battery Energy Control Module (BECM) that is located in the battery pack, and wherein the primary monitoring system monitors at least one battery characteristic to determine the battery status, and wherein the primary monitoring system generates a detection signal when the at least one battery characteristic meets a predetermined criteria;
    a secondary monitoring system configured to monitor the battery status as communicated by the primary monitoring system over a network, wherein the secondary monitoring system comprises a control module that is external to the battery pack, and wherein the BECM communicates battery status information to the secondary monitoring system over the network; and
    wherein at least one of the primary and secondary monitoring systems generates a warning signal when the battery status comprises a thermal event that reaches a predetermined level, wherein the secondary monitoring system uses external information and the battery status to determine when to generate the warning signal, and wherein the external information comprises a loss of communication with the primary monitoring system, and wherein the secondary monitoring system generates the warning signal if there is a loss of communication with the primary monitoring system after the detection signal has been communicated.

2. The system as recited in claim 1, wherein the at least one battery characteristic comprises at least one of battery temperature, voltage, or current.

3. The system as recited in claim 1, wherein the thermal event comprises a thermal runaway event and wherein the predetermined level comprises at least a first level where the battery status is normal and a second level where at least one battery pack malfunction is identified, and
    wherein the warning signal is generated by the primary or secondary monitoring system when the second level is reached, or
    wherein the warning signal is generated by the secondary monitoring system when the primary monitoring system has communicated the battery status is at the second level and there is a subsequent loss of communication with the primary monitoring system once the second level has been identified.

4. The system as recited in claim 1, wherein if the detection signal is communicated to the secondary monitoring system by the BECM when the BECM determines the predetermined criteria has been exceeded.

5. The system as recited in claim 4, wherein the warning signal is generated via the secondary monitoring system if there is a loss of communication with the primary monitoring system after the detection signal has been communicated to the secondary monitoring system.

6. A system, comprising:
    a primary monitoring system located in a battery pack for an electrified vehicle to determine a battery status, wherein the primary monitoring system comprises a Battery Energy Control Module (BECM) that is located in the battery pack, and wherein the primary monitoring system monitors at least one battery characteristic to determine the battery status, and wherein the primary monitoring system generates a detection signal when the at least one battery characteristic meets a predetermined level;

a secondary monitoring system located externally of the battery pack and configured to monitor the battery status over a CAN, wherein the secondary monitoring system comprises a control module that is external to the battery pack, and wherein the BECM communicates battery status information to the secondary monitoring system over the CAN; and wherein at least one of the primary and secondary monitoring systems generates a warning signal when the battery status indicates a thermal runaway event, wherein the secondary monitoring system uses external information and the battery status to determine when to generate the warning signal, and wherein the external information comprises a loss of communication with the primary monitoring system, and wherein the secondary monitoring system generates the warning signal if there is a loss of communication with the primary monitoring system after the detection signal has been communicated.

7. The system as recited in claim 6, wherein the at least one battery characteristic comprises at least one of battery temperature, voltage, and current.

8. The system as recited in claim 6, wherein the secondary monitoring system is activated in response to receiving a communication of the detection signal, and/or wherein the secondary monitoring system uses the external information and the detection signal to determine when to generate the warning signal.

9. The system as recited in claim 6, wherein the thermal runaway event comprises a thermal event where the at least one battery characteristic exceeds if the predetermined level, and wherein if the detection signal is communicated to the secondary monitoring system by the BECM when the BECM determines the predetermined level has been exceeded, and wherein the detection signal activates or awakens the secondary monitoring system.

10. The system as recited in claim 9, wherein the warning signal is generated via the secondary monitoring system if there is a loss of communication with the primary monitoring system after the detection signal has been communicated to the secondary monitoring system.

11. A method comprising:
providing a primary monitoring system in a battery pack for an electrified vehicle to determine a battery status, wherein the primary monitoring system comprises a Battery Energy Control Module (BECM) that is located in the battery pack, and wherein the primary monitoring system monitors at least one battery characteristic to determine the battery status, and wherein the primary monitoring system generates a detection signal when the at least one battery characteristic meets a predetermined level;

locating a secondary monitoring system externally of the battery pack to monitor the battery status over a CAN, wherein the secondary monitoring system comprises a control module that is external to the battery pack, and wherein the BECM communicates battery status information to the secondary monitoring system over the CAN; and generating a warning signal via at least one of the primary and secondary monitoring systems when the battery status indicates a thermal runaway event, wherein the secondary monitoring system uses external information and the battery status to determine when to generate the warning signal, and wherein the external information comprises a loss of communication with the primary monitoring system, and wherein the secondary monitoring system generates the warning signal if there is a loss of communication with the primary monitoring system after the detection signal has been communicated.

12. The method as recited in claim 11, including generating the detection signal via the primary monitoring system when the at least one battery characteristic exceeds the predetermined level, and activating the secondary monitoring system in response to receiving a communication of the detection signal, and/or generating the warning signal via the secondary monitoring system if there is a loss of communication with the primary monitoring system after the detection signal has been communicated to the secondary monitoring system.

13. The method as recited in claim 11, wherein the thermal runaway event comprises a thermal event where the at least one battery characteristic exceeds the predetermined level, and including communicating the detection signal to the secondary monitoring system when the BECM determines the predetermined level has been exceeded, and wherein the detection signal activates or awakens the secondary monitoring system.

* * * * *